Sept. 18, 1962  E. L. GODSEY  3,054,589
ADJUSTABLE AND RIGIDLY POSITIONABLE MOUNTING DEVICE
Filed Oct. 20, 1961  2 Sheets-Sheet 1
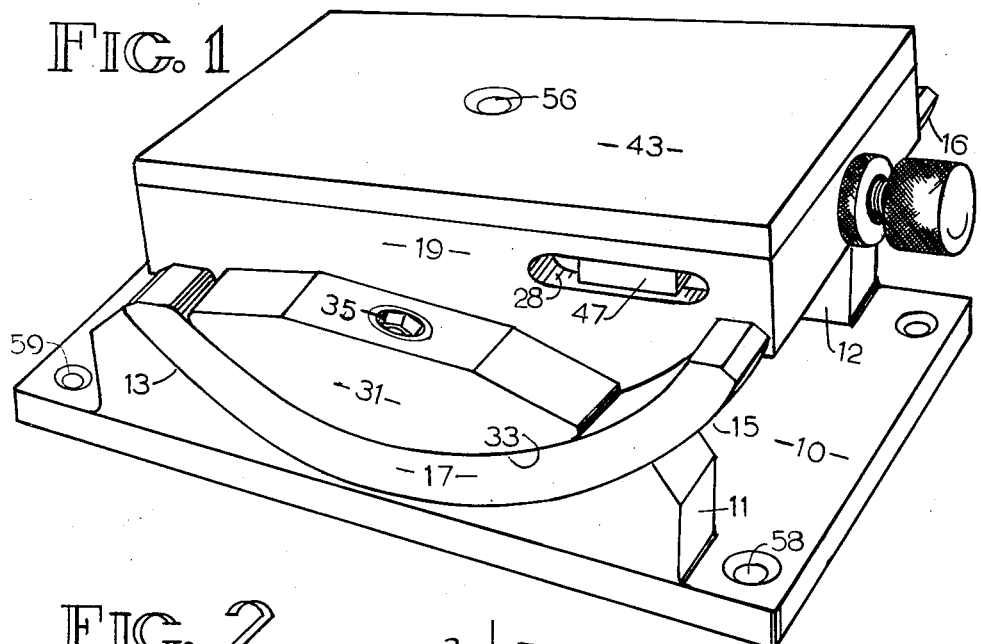
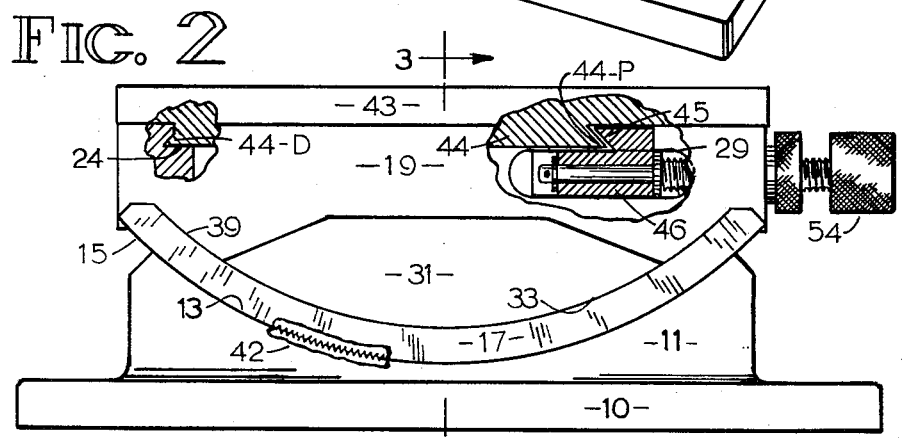
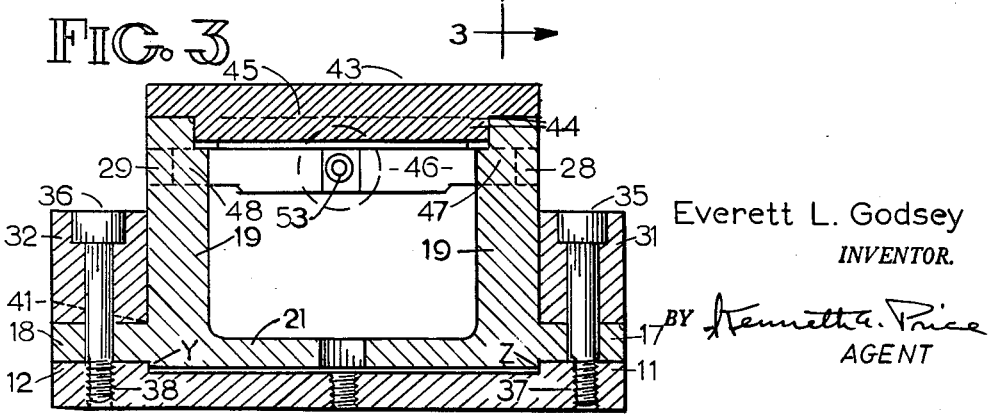
Everett L. Godsey
INVENTOR.
BY Kenneth A. Price
AGENT

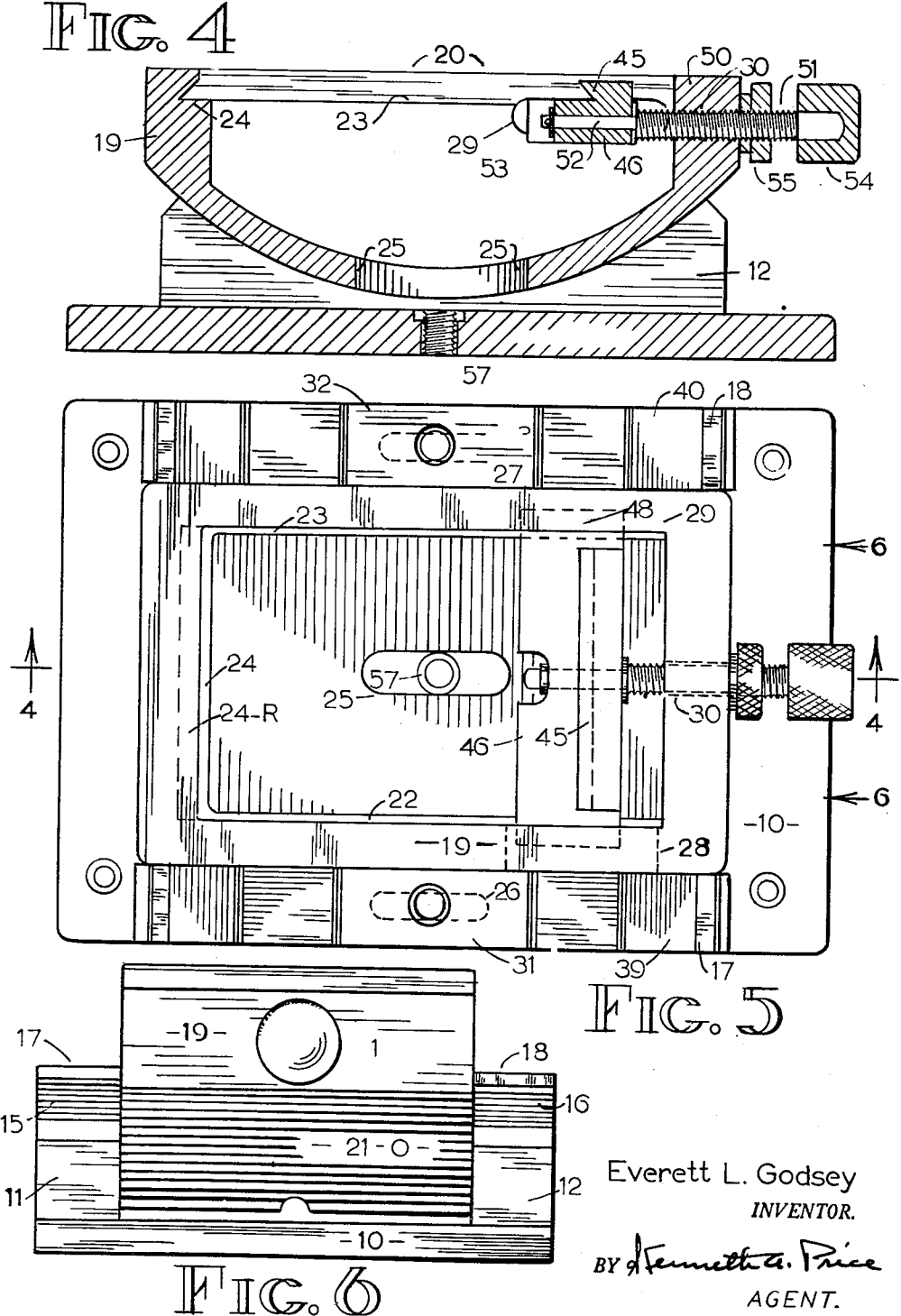

United States Patent Office 3,054,589
Patented Sept. 18, 1962

3,054,589
ADJUSTABLE AND RIGIDLY POSITIONABLE
MOUNTING DEVICE
Everett L. Godsey, 1666 10th St., Santa Monica, Calif.
Filed Oct. 20, 1961, Ser. No. 146,628
6 Claims. (Cl. 248—185)

The present invention relates to devices for mounting cameras or data recording instruments of various kinds in fixed positions, and relates more particularly to an improved device of this character which is provided with a removable adapter plate, to which the instrument is attached, which may be removed from and re-installed in the mounting means without disturbing the fixed position of the mount or altering the visual area encompassed by the instrument.

Prefatorily, it should be pointed out that the purpose of the device of this invention is different from, and in certain respects opposite to, that of the tripod mounted movable heads commonly used with still and motion picture cameras. The latter are designed for the greatest possible flexibility of movement from one position to another, and for continuous and simultaneous movement horizontally and vertically while following a moving object. Mechanically, they range from the gear driven, crank operated pan and tilt heads of early motion picture days to the so-called free heads, which are moved by means of a single rearwardly extending handle, such as those now generally used on television cameras. Functionally, all of these movable heads were designed to provide optimal flexibility in centering the object being photographed within the range of the camera.

Modern techniques in data recording and intermittent photography require a rigid, fixed position instrument mount which will, in turn, assure that the instrument is centered upon the same point in space and provides the same peripheral lines and boundaries to which reference may be made in calculating factors such as speed, direction, size, time, etc., as revealed in single or time spaced successive records. For use in this field, the instrument mount must not only be fixed in position, but must be rigid and stable in order to minimize the distortional effects of vibration, wind pressure, concussion and the like.

From the foregoing, it can be seen that rigid mounts of the general type of the present invention, involve structural and functional characteristics directly opposite to those of the free head, as presently perfected, and follow a completely different direction in the development of the general art.

The present invention has been made with the foregoing considerations in mind, and can be said to have a plurality of important objectives.

One important object of the present invention is the provision of a mounting device adapted for holding a camera or sighting instrument in a definitely fixed position.

Another important object of this invention is the provision of a device of the character described which is provided with an upper planar mounting surface of sufficient area to provide contact with the entire under surface of the majority of cameras and sighting instruments, and which is further provided with a planar basal surface of generous proportions for rigid mounting on any flat supporting surface.

A further important object of the present invention is the provision of a mounting device of the character described which is completely adjustable in the horizontal plane, and adjustable vertically through an arc of more than sixty degrees.

A still further important object of the present invention is the provision of an instrument mounting device of the character described having an interfitting mounting plate which may remain attached to the instrument, and which is independently removable from the main body of the mounting device so that the instrument may be removed from and re-installed in the mount without disturbing or changing the directional setting of the mount, thereby assuring that exactly the same area in space is encompassed by the optical system of the instrument during successive re-installations.

An additional object of the present invention is the provision, together with an instrument mounting device of the general character described, of minimal dimensional tolerances in the main body of the mounts and the removable plates interfitting therewith so that a plurality of such plates with instruments attached thereto may be installed interchangeably in one or a plurality of such mounts.

A further additional object of the present invention is the provision of an instrument mounting device of the character described in which the means for releasing the removable mounting plate consists of a single manually operable knob enabling a technician to lift or steady the instrument with one hand while securing or releasing it with the other.

And a correlate object of this invention is the provision in a mounting device of the type described of completely separate and unrelated means for fixing the position of the mount in the horizontal plane and for fixing its position in the vertical plane, so that its position in either relationship is unaffected by adjustments or changes made in the other.

In brief, the adjustable and rigidly positionable mounting device of my invention includes a planar normally horizontal base member having upwardly extended arcuately formed concave bearing portions along opposite sides thereof; a box-like frame member, open at the top and having laterally extended arcuately formed downwardly convex runner portions adapted to fit upon and slide in contact with the upper surfaces of the basal bearing portions; clamp blocks disposed upon the upper surfaces of the runner portions of the frame and tightenable thereon by means of bolts extending downwardly through longitudinal slots in the runners and engaged in threaded bores in the base; and a removable mounting plate having dovetail sections at opposite ends adapted for engagement with interfitting portions of the frame member at one end and a movable locking bar adjacent the other end. A centerbore through the base provides a complete range of directional adjustment in the horizontal plane, and the range of movement in the vertical plane is limited only by the length of the slots in the runner portions. Either position may be adjusted without affecting the other.

Additional objects of the invention and numerous possible variations in the particular embodiment set forth herein will become apparent upon examination of the following specification together with the references contained therein to the drawings, of which:

FIGURE 1 is an angular view in perspective of an instrument mounting device constructed in accordance with the present invention and shown with the upper mounting plate tilted slightly relative to the base portion;

FIGURE 2 is a side elevational view on a somewhat reduced scale of the mounting device of FIGURE 1, as it would appear with the upper mounting plate positioned generally parallel to the base; fragmentary vertical sectional areas are shown to reveal the manner in which the upper mounting plate is dovetailed into the frame portion of the main body;

FIGURE 3 is a vertical cross sectional view of the same device as it would appear when seen from along the line and in the direction indicated by the arrows 3—3 in FIGURE 2;

FIGURE 4 is a vertical longitudinal sectional view of the device of the present invention with the mounting plate removed and shown as it would appear from along the line and in the direction indicated by the arrows 4—4 in FIGURE 5;

FIGURE 5 is a plan view of the mounting device as it would appear with the upper mounting plate removed; and FIGURE 6 is an end elevational view of the device with the mounting plate installed and shown as it would appear from the direction indicated by the arrows 6—6 in FIGURE 5.

Reference is again made to the perspective view of FIGURE 1 showing a mounting device constructed in accordance with the present invention. The basal member of the assembly is seen to include a planar base plate 10 which is generally rectangular in shape as more clearly shown in the plan view of FIGURE 5. Integrally formed with the base plate 10 are two oppositely disposed and upwardly extended bearing portions 11 and 12, the upper surfaces of which are arcuately concave as indicated at 13 and 14 in FIGURES 1 and 3 so as to receive in slidable contact therewith the arcuate under surfaces 15 and 16 of the runner portions 17 and 18 in the manner best understood by collective reference to FIGURES 1, 3 and 6.

As may be clearly understood from the cross sectional view of FIGURE 3, the runner portions 17 and 18 are actually lateral extensions from, and are integrally formed with, a box-like movable frame 19 which has an opening 20 in its top, as shown in FIGURES 4 and 5 and is provided with a rounded bottom section 21, the inner and outer surfaces of which are designated respectively by the numerals 21–1 and 21–0.

It will be noted in FIGURE 3 that the outer surface 21–0 of the rounded bottom section 21 of the frame 19 is finished along an arc of slightly greater diameter than that of the under surfaces 15 and 16 of the runners 17 and 18, and consequently interfits, as indicated at Y and Z in the sectional view of FIGURE 3, between the bearing portions 11 and 12 which extend upwardly from the base plate 10. In this manner the lateral stability and the longitudinal alignment of the frame 19 relative to the base 10 are assured.

As is clearly shown in the longitudinal sectional view of FIGURE 4 and the plan view of FIGURE 5, both of which show the device with the mounting plate removed, inner shoulder surfaces are provided adjacent the top 20 of the frame 19 in its parallel sides as indicated at 22 and 23 and along one end as shown at 24, the shoulder 24 being under cut as seen in FIGURES 2 and 4 to provide a transverse wedge shaped recess 24–R.

Other structural features of the movable frame member 19 include a vertically opening slot 25 disposed longitudinally in the bottom 21, and similar parallel slots, 26 and 27 respectively, provided in the laterally extending runner portions 17 and 18. Horizontally opening slots 28 and 29 are formed and extend longitudinally in the upright opposite sides of the frame 19 in the manner best seen at 28 in the perspective view of FIGURE 1, and a threaded bore 30, clearly shown in FIGURE 4 and indicated in FIGURE 5, is provided in the upright end of the frame opposite from the end having the transverse recess 24–R.

A pair of clamp blocks 31 and 32 are formed with downwardly convex surfaces, such as 33 in FIGURES 1 and 2, adapted to fit slidably upon the arcuately concave upper surfaces, such as 34, of the runner portions 17 and 18. The clamp blocks 31 and 32 are also positioned in slidable contact with the respective opposite vertical sides of the movable frame member 19, and are tightenable upon the runner portions 17 and 18 by means of the bolts 35 and 36 which extend through the longitudinally extended vertically opening slots in the runner portions indicated at 26 and 27 in FIGURE 5, and are received in the threaded bores 37 and 38 in the base 10, as clearly shown in FIGURE 3.

In actual manufacturing practice the interfitting parts are formed so that the arcs of the basal bearing surfaces 13 and 14 are measurably smaller in diameter than the arcs of the under surfaces 15 and 16 of the runners 17 and 18; and, similarly, the arcs of the under surfaces such as 33 of the clamp blocks 31 and 32 are measurably greater in diameter than the arcs of the upper surfaces 39 and 40 of the runner portions 17 and 18. Thus, tightening the bolts 35 and 36 relative to the base 10 forces the upper and lower surfaces of the runners into contact at two spaced points with the adjacent surfaces of the clamp blocks 31 and 32 and bearing portions 11 and 12 of the base 10; furthering tightening of the bolts forces more of the area of the adjacent surfaces into contact.

To meet the relatively infrequent problem of mounting an instrument which by reason of its construction is much heavier at one end than the other or which must be tilted at an angle which throws its weight off center, I employ an alternate method of forming the runner portions 17 and 18 and the clamps 31 and 32 in which the upper surfaces of the runners and the under surfaces of the blocks are slanted downwardly and inwardly from their outer edges to the frame 19, as indicated by the broken line 41 in FIGURE 3. This construction, as will be readily understood, produces a wedging effect when the clamps are tightened upon the runners, forcing the clamps laterally against the vertical sides of the frame 19 and substantially increasing the frictional holding power deriving from the adjacent vertical surfaces.

In applications in which inordinate stresses are encountered and definite rigidity in the horizontal plane is an uncomprisable requirement, I prefer to provide continuous and interfitting patterns of transverse serrations in the under surfaces of the runners and the upper surfaces of the bearing portions as indicated fragmentarily at 42 in FIG. 2.

A generally planar mounting plate 43 is adapted to fit over the top of the movable frame 19, as shown in FIGURES 1, 2 and 4, and is provided with a downwardly extended portion 44 which fits within the side and end walls of the frame 19 above the shoulder sections 22, 23 and 24. At its end adjacent the shoulder 24 the under portion 44 of the top plate 43 is terminated in an outwardly etxended triangular ridge 44–D defining a dovetail portion adapted to interfit within the recess 24–R indicated in FIGURE 5 in the manner clearly shown in the fragmentary vertical section of FIGURE 2.

A similar triangular ridge 44–P is extended from the opposite end of the under portion 44, as is also shown in FIGURE 2, and provides a dovetail portion adapted to be engaged by an oppositely disposed triangular ridge 45 extended from a locking bar 46 the ends of which 47 and 48 are slidably supported in the longitudinal slots 28 and 29 as indicated collectively in FIGURES 1–5.

In the threaded bore 30, provided as seen in FIGURE 4 in the end wall 50 of the frame 19, a continuously threaded rod 51 is entered and extended inwardly of the frame. The rod 51 is formed with an unthreaded terminal portion of reduced diameter 52 which is extended through a horizontal bore in the locking bar 46 and is retained therein by means of the washer and retaining pin indicated at 53 in FIGURES 3 and 4.

At its end extended outwardly of the frame 19, the threaded rod 51 is fitted with a knurled knob 54 and a threaded lock ring 55 adjacent the frontal wall 50 of the frame. As will be readily understood from the various figures, rotating the knob 54 clockwise will move the locking bar 46 longitudinally of the horizontal slots 28 and 29 until the projection 45 engages between the projection 44–P and the under surface of the plate 43 and the opposite ridge 44–D is forced into the recess 24–R in the manner shown in FIGURE 2. Rotating the knob 54 counterclockwise sufficiently to draw the projecting ridge 45 completely out of engagement with the ridge 44–P of the under portion 44 permits the end of the mounting plate 43 adjacent the knob to be lifted above the frame 19 so as to disengage the ridge 44–D from the recess 24–R and enable the plate and an instrument mounted thereon to be removed from the frame.

As shown in FIGURES 1, 3, 4, and 5, the mounting plate 43 is provided with a central bore 56 by means of which an instrument to be mounted on the device may be secured to the removable mounting plate, and the base plate 10 is provided with a central bore with a threaded fitting 57 therein adapted to receive the threaded attachment bolt of a conventional professional tripod. A plurality of bores, such as 58 and 59 are provided in the base 10 for the purpose of fastening it, if desired, to any generally flat surface.

It will be apparent from the foregoing specification that I have provided by invention a rigid mounting device which is well adapted to hold optical and photographic instruments in fixed positions, and which may be attached to any conventional tripod, or fastened by ordinary means to any flat surface.

It will be further understood from the above description that the invention provides a mounting device which is completely adjustable circumferentially in the horizontal plane, and which is adjustable vertically through an arc of more than sixty degrees.

Also to be understood from the foregoing is the fact that the mounting device provided by my invention includes an interfitting readily removable mounting plate which may remain attached to the instrument when it is dismounted for service or inspection, the plate being independently removable from the body of the device without changing or disturbing its directional setting.

Additionally apparent from the above description is the fact that the device provided through my present invention is adapted with convenient, manually operable means for removing the mounting plate, and for independently adjusting either the horizontal or the vertical setting without affecting the other.

Another significant improvement in mounting devices of this general character will be seen to derive from the particular construction provided by my invention which makes it possible to move an instrument, with its mounting plate attached, from one pre-set mount body to another, or to install a replacement instrument attached to its own pre-set mounting plate, with complete assurance that it will assume exactly the same directional attitude in space as that of the original instrument.

Although in order to comply with the statute I have described and shown the mounting device of my invention in a single specific form or embodiment, it will be remembered that various details are subject to change and variation, and the embodiment itself is subject to substantial alteration without departing from the spirit and scope of the broad invention, and it is therefore to be understood that my invention of a rigid instrument mounting device of the general character set forth herein is not to be limited or restricted in any manner except as may be indicated by the scope of the following claims.

What is claimed is:

1. In an adjustable mounting device for holding sighting and viewing instruments rigidly in fixed positions, the combination comprising: a planar base having means for attaching it to a conventional tripod and to any generally flat surface; support members extended upwardly from opposite sides of said base and terminated in upwardly concave quadrantal bearing surfaces; a generally rectangular main body having upright side and end walls and being open at the top; arcuate runner portions extended outwardly from opposite sides of said main body and adapted to interfit in sliding contact with said bearing surfaces, said runners having vertically opening slots extended longitudinally therein; a transverse groove formed in the inner surface of one end wall of said main body adjacent the open top thereof, and laterally opening longitudinally extended slots in the opposite side walls; a locking bar supported at opposite ends in said laterally opening slots, and a longitudinal groove therein formed oppositely from said groove in said end wall; a planar mounting plate having central bore means for attaching an instrument thereto, adapted to fit upon and into the open top of said main body and having transverse ridges oppositely extended adjacent the ends thereof and engageable in said transverse grooves in said end and said locking bar; threaded rod and knob means for moving said locking bar so as to engage one of said projecting ridges in its groove; and clamp block means disposed in sliding contact with the upper surfaces of said runners, and bolts extended downwardly through slots in said runners into threaded bores in said base, said bolts being tightenable in said clamp blocks relative to said base so as to hold said main body and a mounting plate in the top thereof in fixed position relative to said base.

2. In an adjustable mounting device for holding optical and photographic instruments rigidly in fixed positions, the combination of: a planar generally rectangular base having perforate means for attaching it to a conventional tripod and to any generally flat surface; support members extended upwardly from opposite sides of said base and terminated in upwardly concave arcuate bearing surfaces; a main body member defining a heavy frame with upright side and end walls, open at the top and rounded at the bottom to permit rotation relative to a horizontal axis parallel to said base; runner portions extended outwardly from opposite sides of said main body, the under surfaces of said runners being formed convexly and adapted to interfit in sliding contact with the concave bearing surfaces of said basal support members, and the upper surfaces of said runners being concave and formed along arcs substantially concentric with the arcs of said under surfaces; vertically opening slots extended longitudinally in said runners, and laterally opening slots formed in opposite sides of said main body adjacent one end thereof; a transverse groove formed in the inner surface of one end wall of said main body and a threaded bore through the end opposite said groove axially aligned between and parallel to said laterally opening slots in said body side walls; a locking bar slidably supported at opposite ends in said laterally opening slots, and having a groove formed therein oppositely from said groove in said end wall; a generally planar mounting plate, having means for attaching an instrument thereto, adapted to fit upon and into the open top of said body and having transverse ridges oppositely extended outwardly adjacent the ends thereof and adapted for engagement in said transverse grooves in said body and said locking bar; a threaded rod with knob means for moving said locking bar so as to engage one of said projecting ridges in its groove; clamp block means disposed in sliding contact with the upper surfaces of said runners, and bolts through said clamp blocks extended downwardly through said slots in said runners into threaded bores in said base, and being tightenable relative to said base so as to hold said runners, said main body and said mounting plate locked in the top thereof in fixed position relative to said base.

3. In an adjustable mounting device, means for holding optical and photographic instruments rigidly in fixed positions comprising the combination of: a planar generally rectangular base having perforations therein by means of which it may be attached to a conventional tripod and to any generally flat surface; support members extended upwardly from opposite sides of said base and terminated in upwardly concave arcuate bearing surfaces formed with transverse serrations therein; a main body member defining a heavy frame with upright side and end walls, open at the top and rounded at the bottom to permit rotation of the body member relative to a central horizontal axis parallel to said base; runner portions extended outwardly from opposite sides of said main body, the under surfaces of said runners being formed convexly and provided with transverse serrations adapted to mesh with said serrations in said bearing surfaces, the upper surfaces of said runners being concave and formed along arcs substantially concentric with the arcs of said under surfaces; vertically opening slots extended longitudinally in said runners, and laterally opening slots formed in opposite sides of said main body adjacent one end thereof; a transverse groove formed in the inner surface of one end wall of said main body and a threaded bore through the end opposite said groove axially aligned between and parallel to said laterally opening slots in said main body side walls; a locking bar slidably supported at opposite ends in said laterally opening slots, and having a groove formed therein oppositely from said groove in said end wall; a generally planar mounting plate, having means for mounting an instrument thereon, adapted to fit upon and into the open top of said main body and having transverse ridges oppositely extended outwardly adjacent the ends thereof and receivable in said transverse grooves in said main body and said locking bar; screw and knob means for moving said locking bar so as to engage one of said ridges in said groove therein; clamp block means adapted for and disposed in sliding contact with the upper surface of said runners, and bolts through said clamp blocks extended downwardly through said slots in said runners into threaded bores in said base and being tightenable relative to said base so as to hold the serrated surfaces of said runners in meshing contact with said serrated bearing surfaces and main body and mounting plate in the top thereof in fixed position relative to said base.

4. In an adjustable mounting device, means for holding heavy instruments rigidly in fixed positions, including the combination of: a flat generally rectangular base having means for attaching it to a conventional tripod and to any generally flat surface; support members extended upwardly from opposite sides of said base and terminated in upwardly concave arcuate bearing surfaces; a main body member defining a box-like frame having upright side and end walls, and being open at the top and rounded at the bottom; runner means extended outwardly from opposite sides of said main body, the under surfaces of said runners being formed convexly and adapted to interfit slidably with said bearing surfaces, the upper surfaces of said runners being concave and formed angularly in cross section so that they are thicker at their outer edges than at their jointures with the main body; vertically opening slots extended longitudinally in said runners, and laterally opening slots formed in opposite sides of said main body adjacent one end thereof; locking bar means slidably supported at its opposite ends in said laterally opening slots; transverse grooves formed oppositely in one end of said main body and said locking bar; a removable plate, having central bore means for attaching an instrument thereon, adapted to fit upon and extend downwardly into the open top of said main body and having oppositely disposed transverse ridges extended therefrom adapted for engagement in said transverse grooves; threaded rod and knob means for moving said locking bar so as to engage one of said ridges in said groove therein; clamp block means disposed in sliding contact with the upper surfaces of said runners, and bolts through said clamp blocks extended downwardly through said slots in said runners into threaded bores in said base, the under surfaces of said clamp blocks being downwardly convex and angularly formed so as to mate with said angular upper surfaces of said runners in such a manner that when said bolts are tightened relative to said base, the clamp blocks are drawn downwardly upon said runners and are also forced diagonally inwardly against the respective side walls of said main body so as to hold said main body and the mounting plate locked in the top thereof in fixed position relative to said base.

5. An adjustable, rigidly positionable mounting device for supporting heavy instruments, including the combination of: a base plate, and a box-like main body open at its top; support means providing arcuate bearing surfaces extended upwardly from said base, and runner portions interfitting slidably with said bearing surfaces, extended outwardly from opposite sides of said main body; longitudinally extended vertical slots in said runners; clamp blocks adapted to interfit upon the upper surfaces of said runners, and bolt means extended through said runner slots adapted to impose tension between said clamp blocks and said base; laterally opening horizontal slots in opposite side walls of said main body, and locking bar means slidably supported in said body slots; transverse grooves disposed oppositely in said locking bar and one end wall of said body; a mounting plate, having means for attaching an instrument thereto, adapted to fit upon and downwardly into the open top of said body, and having ridge means oppositely extended therefrom receivable in said grooves; and screw and knob means for moving said locking bar so as to engage said riges in said grooves.

6. In an adjustable mounting device for holding heavy instruments rigidly in fixed positions, the combination comprising: a planar base member attachable to a conventional tripod and to any generally flat surface; support members extended upwardly from opposite sides of said base and terminated in upwardly concave arcuate bearing surfaces; a main body member defining a box-like closure with upright side and end walls, open at the top and rounded at the bottom; runner portions extended outwardly from opposite sides of said main body having under surfaces convexly formed and finished along arcs of measurably greater diameter than those of said basal bearing surfaces into which they interfit, the upper surfaces of said runners being concave; vertically opening slots extended longitudinally in said runners, and laterally opening slots formed in opposite sides of said main body adjacent one end thereof; a locking bar slidably supported at opposite ends in said laterally opening slots; transverse grooves formed oppositely in one end of said main body and in said locking bar; removable mounting plate means adapted to fit upon and extend downwardly into the open top of the main body and having oppositely disposed transverse ridges outwardly extended therefrom and adapted to be received in said transverse grooves, said mounting plate having means for attaching an instrument thereto; threaded rod and knob means for moving said locking bar so as to engage one of said ridges in said groove therein; clamp block means disposed in sliding contact with said upper runner surfaces, the under surfaces of the clamp blocks formed convexly and finished along arcs of measurably greater diameter than the arcs of the upper runner surfaces, and bolts through said clamp blocks extended downwardly through said vertically opening slots in said runners into threaded bores in the base; the measurably greater diameters of the convex surfaces of both the clamp blocks and the runners, compared to the concave surfaces with which they interfit, are adapted to produce a two point wedging action between each pair of adjacent surfaces and to provide a progressive increase in the area of surface contact between the interfitting parts as the bolts are tightened so as to hold said runners, said main body and said mounting plate in the top thereof in fixed position relative to said base.

References Cited in the file of this patent

UNITED STATES PATENTS

| | | |
|---|---|---|
| 470,802 | Hannes | Mar. 15, 1892 |
| 2,893,674 | Monaco | July 7, 1959 |
| 2,922,609 | Collier | Jan. 26, 1960 |

FOREIGN PATENTS

| | | |
|---|---|---|
| 937,365 | France | Mar. 8, 1948 |